United States Patent Office 3,299,620
Patented Jan. 24, 1967

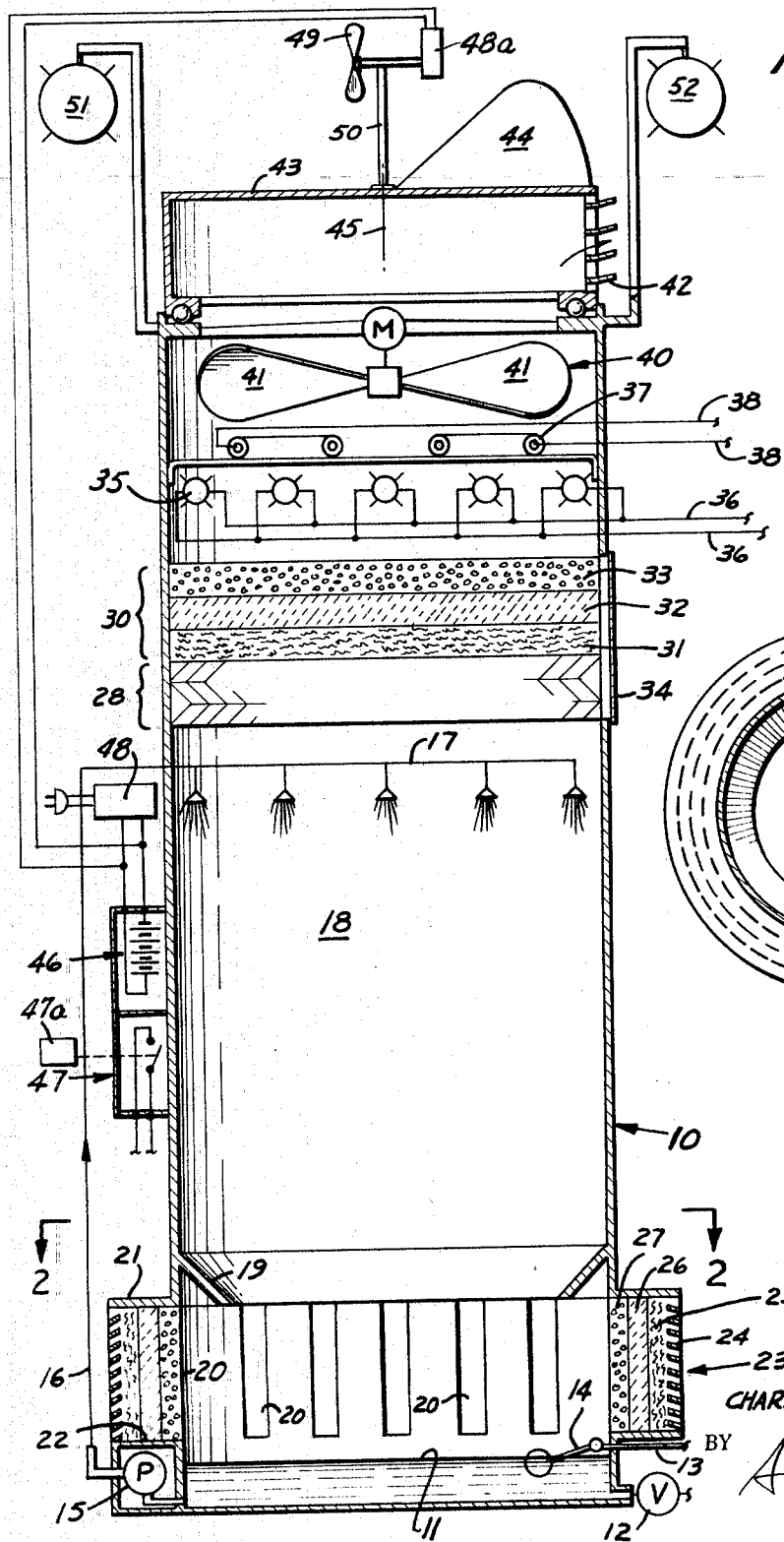

3,299,620
GAS TREATMENT DEVICE
Charles E. Hollingworth, 1167 S. Orange Grove Blvd.,
Pasadena, Calif. 91105
Filed Mar. 9, 1964, Ser. No. 350,200
10 Claims. (Cl. 55—126)

This invention relates to the treatment and purification of air.

The increasing pollution of air has brought with it numerous health and other hazards, which are in general derived from the contaminants introduced by increasing human and industrial activity. One of the best known existing hazards is that of smog, which is largely derived from hydrocarbons, and from their reaction with oxides of nitrogen in the sunlight. Its threat to health is becoming increasingly apparent. However, it has been so intensively investigated largely because it is so nauseating and bothersome. Many hazards are equally serious to large groups of people, but simply are less appreciated as yet because they are less bothersome, or bother fewer people. An example of this latter class is the increase of bacterial concentration in the air of congested areas.

In addition to already-existing hazards, there are the ever present dangers inherent in national emergencies, such as those of nuclear fallout, and of bacterial and gas warfare. These hazards, too, are borne by the air, and are, in general, removable contaminants.

Decontamination of gases, including air, is not per se new, and many efforts have been made to accomplish such a result, in view of the obvious benefits attainable thereby. For example, the respiratory advantages derived from air conditioning where water is passed over wet coils is well known, and many refrigerant air conditioning systems include water spray chambers for the purpose of eliminating from the air the coarser contaminants thereof. In addition, devices exist which utilize germicidal lamps and/or filters exist to kill and/or remove other particulate matter. There has not as yet, however, been a substantial unit able to purify air of many and wide varieties of contaminants and organisms and which is suitable for large-scale applications. There is a growing belief that, particularly in large cities, it may be necessary to go so far as to place decontamination units in the streets to overcome certain of the disadvantages of increased human activity. No conventional device heretofore has been able to be adapted for such large-scale operation, and it is an object of this invention to provide the same.

This invention enables a device to be sensibly packaged as a unit, which offers the capacity to remove substantially all known types of particulate or gaseous pollutants, and in addition to eliminate by killing many types of bacterial and fungicidal contaminants. In addition, it can be built to function in and improve air in natural-flow conduits such as streets or draws, as well as in buildings—the latter by being installed either in rooms or in duct systems.

This invention may provide means for integral reserve power so as to be available in time of disruption of normal services, and is adaptable to remote control. In addition, it is adaptable to use of various types of decontaminating units in wide selection.

A device according to this invention includes a generally vertical housing having an upwardly rising central passage therethrough. Air inlet means, preferably peripheral, is provided near the base of the device. At the base of the device, there is a reservoir to receive liquid from the sprays in a spray chamber through which the air passes in an upward direction to eliminate those contaminants which are water-soluble or of such particulate size that they can be washed out of the air.

Above the spray chamber is a pack of adsorbent and/or absorbent materials for particulate matter.

Above the filters there is disposed a fan for drawing air through the device and exhausting purified air to the atmosphere.

According to a preferred but optional feature of the invention, decontamination filter means is disposed at the air inlet means to remove from the air such particular decontaminants as can be removed by coarse means.

According to still other preferred but optional features of the invention, the device is provided with directional air-current responsive means whereby to treat the air and restore it directly to the environmental air currents.

According to still another preferred but optional feature of the invention, the device is wind-powered.

The above and other features of this invention will be fully understood from the following detailed description and the accompanying drawings in which:

FIG. 1 is a vertical cross-section of the presently preferred embodiment of the invention;

FIG. 2 is a cross-section taken at line 2—2 of FIG. 1; and

FIG. 3 shows an alternate arrangement of a portion of the invention.

FIG. 1 shows a vertical housing 10 which may conveniently be formed from steel tubing or concrete. At its base, there is formed a reservoir 11, which is preferably of rather large capacity in order to provide for optimum operation. The reservoir is shown smaller than scale in the figures. The reservoir includes a combination drain and bleed valve 12 near its bottom, a makeup line 13 and a float control valve 14 for maintaining an appropriate level in the reservoir. The bleed feature of valve 12 assures that the contents of the reservoir do not become saturated with contaminants. The degree of cleanliness of the fluid in the reservoir is in part a function of the rate at which the bleed discharges fluid, because make-up water will be fed at that rate, plus the rate of evaporation of fluid. Bleed fluid will be discharged to sewer, or some other point of disposal.

A recirculating pump 15 withdraws liquid from the reservoir and circulates it through line 16 to a spray header 17 located at the top of spray chamber 18. Baffles 19 near the bottom of the spray chamber deflect the spray from the header away from air inlets 20. The air inlets 20 comprise a plurality of openings through the side of the base, and preferably they extend substantially around the full periphery of the device.

Upper and lower flanges 21, 22, respectively, bound and hold together a decontamination pack 23, which is preferably ring-shaped. A screen 24 protects the outside of the pack, and filters 25, 26, 27 are placed inside. Filter 25 has the following function and construction. It is a low velocity simple dust, dirt and other common solid filter medium employing common filter materials such as coated spun glass, copper, aluminum, or shredded steel; these various materials have been demonstrated to remove 50% to 75% of free solid contaminants.

Filter 26 is an electrostatic type. These are well known and need no detailed description here. Filter 26 is provided to supplement the action of filter 25, by removing such solids as may have passed filter 25. This can result in the removal of 95% to 99% of free solids in the air. In those areas or conditions where solid matter such as dust and pollen is only a minor problem, the user may eliminate filter 26.

Filter 27 is an adsorbent type, the composition of which is selected for the purpose of meeting local conditions as determined by inspection and chemical analysis of the air. It may be filled with media to specifically remove certain compounds or gases, such common media as activated charcoal, silica gel, platinized asbestos, etc. Alternatively or additionally, this filter may be filled with such media as Federal Government or other nuclear agencies may recommend as special absorbers or adsorbers of nuclear fallout solids and gases, a single example being activated charcoal.

The liquid in the reservoir which is passed through the spray boom has the function of washing particular matter and dissolving water-soluble pollutants from the air. In order to improve its action, the liquid employed in the spray may be varied to meet a particular condition; the liquid may in some cases be water from the city main. It may alternatively be any liquid deemed advisable after chemical analysis of the particular air contaminants in the particular area. An alkali or acid for example, could be used for scouring effect to remove contaminants reactive therewith.

Above the spray chamber, there is disposed an eliminator section 28 for entrapping moisture particles from the spray and returning these free moisture particles to the spray chamber thus preventing moisture carryover. The eliminator may be of anglebreak type, preferably made of stainless steel or other non-corrosive material, and similar in construction to that commonly used in ordinary air washers or cooling towers. Alternatively, the eliminator may be of the pad type, using shredded stainless steel or other corrosion resistant shreds.

Just above the eliminator section is another filter pack 30 containing filters 31, 32, 33. Access to this pack is through an access door 34 in the side of the device.

Filter 31 has the function of removing pollutant gases. Such gases prevail almost universally in and around major cities, and are principally caused by automobile fumes, industrial furnaces and processes. The filter medium of filter 31 is activated charcoal, which may or may not be additive to that of filter 27.

Filter 32 is to be filled with material similar but more intensive to that described for filter 27. It may be a specific catalytic agent for a particular local gaseous contaminant or it may be of the adsorber or absorber type as local chemical analysis of the air may indicate as requiring more intensive treatment for purification.

Filter region 33 is provided to be filled with material specified from time to time as useful in fallout decontamination. The best known current example is activated charcoal.

Immediately above filter pack 30, there is disposed a battery of germicidal elements 35 powered through leads 36. These may, for example, be the familiar ultraviolet lamps which have as their function the destruction of organisms which are susceptible to their rays.

Above the germicidal elements, there is disposed a group of heating elements 37 powered through leads 38. The heating elements can be used for temperature control, if desired. Alternatively, they may be used to heat the air when the air is foggy, to clarify it. This device then becomes a safety device which improves visibility.

Immediately above the heating elements is disposed a fan 40 having blades 41 canted so as to move air upwardly through the unit and exhaust the air through louvers 42 in a cap 43. Cap 43 is revolvably supported so as to pivot with the wind. Vane 44 points downstream, being offset from the central axis of rotation 45. The outlet defined by the louvers should be large enough as not to constrict the airflow.

A battery pack 46 is shown for powering the fan, pump and any other device requiring current. This pack, and the units operated by it, is under control of a master switch 47 which can be locally or remotely controlled by a conventional remote actuator 47*a*. A trickle charger 48 of conventional design serves to keep the battery charged.

Where the device is set up in air current paths, it may be rendered wholly or in part wind-actuated, and also, wind power may be used to keep the battery charged by running a generator 48*a* for that purpose. A propellor 49 is mounted to a shaft 50, this shaft preferably turning the generator shaft and charging the batteries. The device would then run either on battery power or on external power from a line. Alternatively, propeller 49 could directly drive fan 41 (FIG. 3).

Should the device be used outdoors, streets lights 51, 52 may be mounted to it.

This device provides means for decontaminating air in large quantities. The combination of means for decontaminating the air results in the production of substantially pure air in large quantities in a device of relatively small bulk, which is easily accessible for maintenance and servicing, and which can be powered by direct or reserve power means.

This invention is not to be limited by the embodiment shown in the drawings and described in the description which is given by way of example and not of limitation, but only in accordance with the scope of the appended claims.

I claim:

1. A gas treatment device comprising: an upright housing having a cavity therein, and a lower inlet and upper outlet through the housing into the cavity; a reservoir inside the housing and beneath the level of the inlet; a spray header inside the housing and above the reservoir and level of the inlet, a recirculation, bleeder and make-up system for withdrawing fluid from the reservoir, discharging it from the spray header countercurrent to gas flow from inlet to outlet, bleeding off fluid from the reservoir, and making it up; a plurality of first filters in the inlet, at least one of said first filters comprising a solid-contaminant type, and at least one of the other said first filters comprising an electrostatic type; eliminator means inside the cavity and above the spray header for entrapping fluid particles from an upward gas current; a plurality of second filters in the cavity and above the eliminator means, at least one of said second filters comprising an adsorbent type, and at least one other of said second filters comprising a reactive type; a fan in the cavity above the second filters; motive means for driving the fan; and a wind-responsive cap in which the outlet is formed, said cap being revolvably supported so as to pivot with the wind to direct the discharge from the device downstream.

2. A device according to claim 1 in which the fan is motor driven, and in which a battery is provided to supply power for the fan.

3. A device according to claim 2 in which application of power to the fan is controlled by a remotely-controllable switch.

4. A device according to claim 1 in which a shaft-mounted propeller is exposed to the wind and is drivingly connected to the fan to drive the same.

5. A device according to claim 1 in which a germicidal lamp is disposed in the cavity and above the second filters.

6. A device according to claim 1 in which a heating unit is disposed in the cavity and above the second filters.

7. A device according to claim 1 in which the first filters additionally include an adsorbent type filter, in which the second filters additionally include a filter suitable to remove nuclear fallout particles, and in which a germicidal lamp and a heating unit are disposed in the cavity above the second filters.

8. A device according to claim 7 in which the fan is motor driven, and in which a battery is provided to supply power for the fan.

9. A device according to claim 8 in which application of power to the fan is controlled by a remotely-controllable switch.

10. A device according to claim 7 in which a shaft-mounted propeller is exposed to the wind and is drivingly connected to the fan to drive the same.

References Cited by the Examiner

UNITED STATES PATENTS

| | | | |
|---|---|---|---|
| 1,861,158 | 5/1932 | Hilger | 55—257 X |
| 2,514,720 | 7/1950 | Rennels | 55—279 X |
| 2,628,083 | 2/1953 | Rense | 55—279 X |
| 2,638,644 | 5/1953 | Rauhut | 55—279 X |
| 3,064,409 | 11/1962 | Schmitt | 55—124 X |

HARRY B. THORNTON, *Primary Examiner.*

ROBERT F. BURNETT, D. TALBERT,
*Assistant Examiners.*